Oct. 28, 1924.  1,513,189
W. A. SHIPPERT
TEAT CUP FOR MILKING MACHINES
Filed March 26, 1921  2 Sheets-Sheet 1

INVENTOR
Warren A. Shippert,
BY Walter N. Haskell
his ATTORNEY

Oct. 28, 1924.
W. A. SHIPPERT
1,513,189
TEAT CUP FOR MILKING MACHINES
Filed March 26, 1921   2 Sheets-Sheet 2
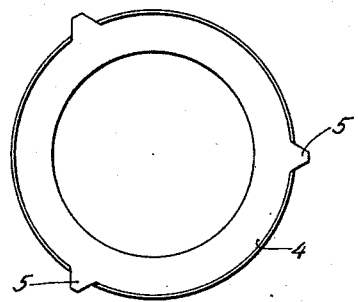
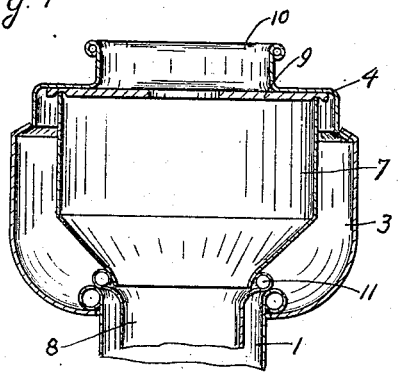
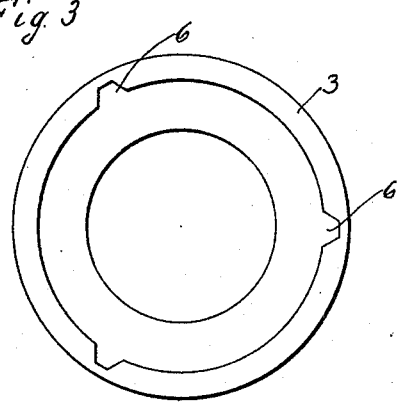
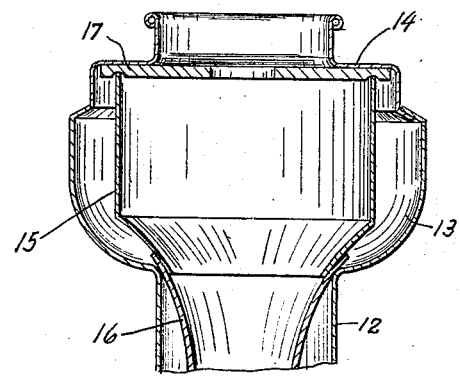
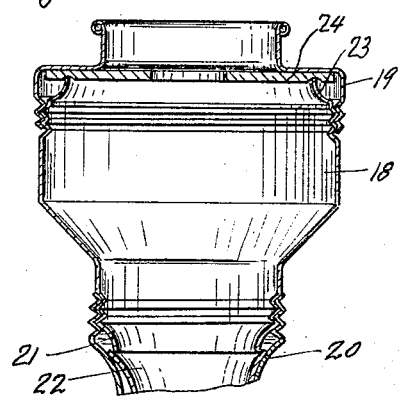
INVENTOR
Warren A. Shippert.
BY Walter N. Haskell
his ATTORNEY Patented Oct. 28, 1924.

1,513,189

UNITED STATES PATENT OFFICE.

WARREN A. SHIPPERT, OF CHICAGO, ILLINOIS.

TEAT CUP FOR MILKING MACHINES.

Application filed March 26, 1921. Serial No. 455,898.

*To all whom it may concern:*

Be it known that I, WARREN A. SHIPPERT, a citizen of the United States, residing at Chicago, in the county of Cook and State of Illinois, have invented certain new and useful Improvements in Teat Cups for Milking Machines, of which the following is a specification.

My invention has reference to teat-cups for milking machines, and relates more specially to that class of such devices the body portion of which is formed of a metal or other non-yieldable wall. These devices are used in clusters in connection with the main part of a milking machine, and are adapted to receive one of the teats of a cow during the milking operation. While firmly grasped by the cup the teat is subjected to recurrent pulsations, similar to those produced by the operation of milking the animal by hand. The pulsations are produced by intermittent vacuum periods formed within the cup followed immedaitely by periods in which the vacuum is released, and atmospheric pressure substituted therefor. As a result, where the teat of the animal projects directly into the cup, it is first subjected to a powerful expansive tendency, sufficient to draw a quantity of milk from the udder, followed at once by a strong contractile force. These actions cause the blood to flow toward the end of the teat more rapidly than it can return therefrom, with a tendency towards the production of a hard formation at the end of the teat immediately after the milking operation is completed. This interferes with the perfect results thereof.

In some cases it has been attempted to overcome this difficulty by using a secondary teat-cup member, or inner tube, within the outer shell, which inner tube or liner has been independently connected with the air-control devices. This has called for a complicated and clumsy arrangement, however, and one which it was difficult or impossible to maintain in a sanitary condition. These are what are known as indirect air release cups, and the liners are attached therein at both ends.

The chief purpose of the present device is to provide a means whereby the full force of the milking vacuum will be felt only at the extreme end of the teat, a partial vacuum being applied to the upper portion of the teat, and assisting in providing a free flow for the milk downwardly through the teat. The means by which this is produced also assists in returning the blood upwardly in a regular manner after the vacuum period has ceased. These and other features and advantages of the invention will be more fully comprehended from the following specification, reference being had to the accompanying drawings, in which:

Fig. 2 is a lower face view of the cap 4, detached.

Fig. 3 is a plan view of the bowl 3, detached.

Figure 1:
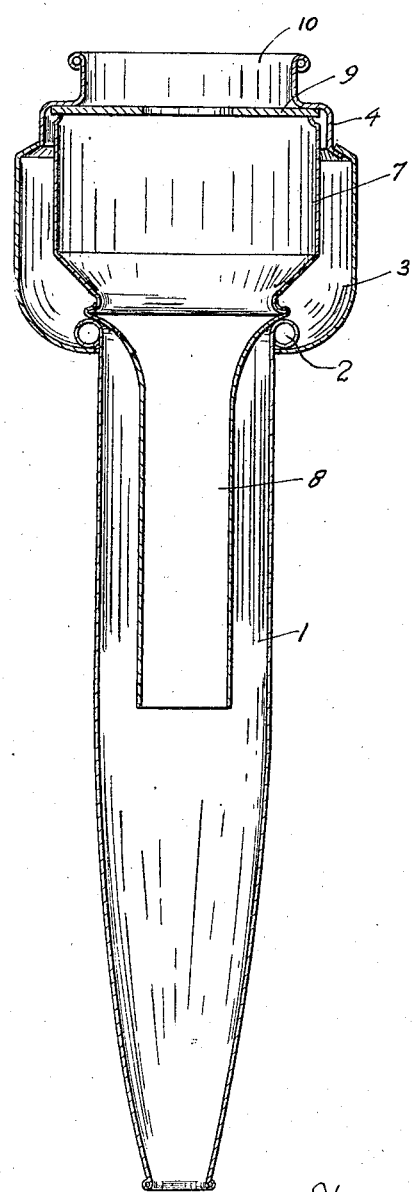
Fig. 1 shows the invention in longitudinal section.

Figs. 4, 5, and 6 illustrate modified forms of the device, in longitudinal section, with a portion of the body part broken away.

1 represents the tubular body portion of the device, tapered towards its lower end, so as to receive the end of a piece of tubing, for connection in the usual manner with the milking machine. At its upper end the part 1 is rolled outwardly, so as to limit the upward movement of a bowl 3, with which is removably connected a cap 4, by means of ears 5 formed on the lower edge of the cap, adapted to enter openings 6 in the upper edge of the bowl, whereupon the cap is rotated with relation to the bowl, preventing accidental separation of the bowl and cap.

Within the bowl is a shell 7, beneath which is suspended a flexible tube 8, open at both of its ends. The lower part of such shell slopes downwardly and inwardly, at an angle of approximately forty-five degrees and the upper end of the tube 8 is grasped tightly between the end of such shell and the rolled edge 2, forming an air seal at that point. Held securely between the upper end of the shell and the cap 4 is a flexible diaphragm 9, having an opening in the center to permit the entry of the teat of a cow The cap 4 is projected upwardly into a collar 10, rolled outwardly at its upper edge, of sufficient size to admit the teat of a cow, and adapted to prevent a portion of the cow's udder being drawn into the cup by the suction therein.

The tube 8 is formed of soft, pliable rubber, or similar material, and when the device is in use the teat of the animal will project downwardly into the same. When the air in the part 1 is partially exhausted the atmospheric pressure in the bowl 7 will be exerted downwardly, between the teat and the tube 8, causing the tube to expand until it is almost free from the teat. The force of the vacuum is exerted almost entirely upon the lower end of the teat, causing the ring muscles to distend, and letting the milk flow out freely. The tube 8 also acts as a guard, to prevent the teat from being drawn too great a distance into the cup, which might occur under an excessive vacuum suction. When the cup is under normal atmospheric pressure the tube 8 grasps the teat snugly, with enough pressure to assist in the circulation of the blood back towards the udder. It also acts as a stop, to prevent release air in the body 1 from passing upwardly into the bowl 7.

The diaphragm 9 embraces the teat tightly at a little distance below the udder, forming an air-tight seal at that point. When there is a vacuum in the part 1, the tendency of the air in the bowl 7 to move downwardly operates to draw the diaphragm inwardly, expanding the same and preventing strangulation of the milk passages at that point. The sloping walls of the bowl 7 render it easy to introduce the teat into the cup or release the same therefrom.

In Fig. 4 of the drawings is shown a slightly different construction wherein the upper end of the tube 8 is fastened to a ring 11, held in place between the lower part of the bowl 7 and upper end of the body 1.

Fig. 5 illustrates another form of the device, wherein the body 12 and shell 13 are integrally formed, the part 13 being adapted for connection with a cap 14, similarly to the parts 3 and 4 of the device first described herein. This form is also fitted with a bowl 15, tube 16 and diaphragm 17, similar to those above set forth.

Fig. 6 illustrates another modification of the invention, wherein the bowl 7 and shell 3 of the original device are combined in the part 18, threaded at its upper end to receive a similarly threaded cap 19, and at its lower end to connect with the threaded end of the body part 20. The lower end of the casing 18 has an extension 21, between which and the part 20 is secured the upper end of a flexible tube 22, similar to the tube 8. At its upper end the part 18 has an extension 23, bearing against the lower face of a diaphragm 24, and holding the same tightly against the cap 19.

It will be seen that with any of the forms of the invention which are set forth herein it is possible to quickly disconnect the parts for the purpose of cleaning them, and as readily re-assemble them.

The diameter of the tube 8 should be approximately one inch.

What I claim and desire to secure by Letters Patent, is:

1. A device of the class described, comprising a rigid tubular body member; a casing of larger diameter than said body member, removably connected therewith; a cap detachably connected with said casing and provided with an outwardly projected collar; a diaphragm within said cap provided with a central opening; a bowl supported within said casing, bearing at its upper end against said diaphragm, and at its lower end against said body member, and a flexible tube depending from the lower end of said bowl, and open at both of its ends.

2. A device of the class described, comprising a rigid tubular body member; a bowl member removably connected therewith; a cap detachably connected with said bowl member and provided with a central opening; a flexible annular diaphragm seated in said cap; and a flexible teat-engaging member depending from the lower end of said bowl member, the lower part of the wall of said bowl member being inclined inwardly towards said teat-engaging member.

3. In a device of the class described, a rigid tubular body member, adapted for connection with the air exhaust devices of a milking machine; a casing removably connected with said body member; a cap detachably connected with said casing, and provided with a central outwardly projected collar; a flexible annular diaphragm located in said cap; a bowl supported within said casing, having converging walls at its inner end; and a flexible tube secured at its upper end between said bowl and said body member, and open at both ends; said bowl having a bearing at its upper end against said diaphragm, and the connection of said cap and casing operating to hold all of said parts united in their proper relations.

In testimony whereof I affix my signature.

WARREN A. SHIPPERT.